(12) United States Patent
Ito et al.

(10) Patent No.: US 8,564,929 B2
(45) Date of Patent: Oct. 22, 2013

(54) STACKED FILM CAPACITOR AND METHOD OF PRODUCING THE SAME

(75) Inventors: Kaoru Ito, Nisshin (JP); Masumi Noguchi, Anjo (JP)

(73) Assignee: Kojima Press Industry Co., Ltd., Toyota-Shi (JP)

( * ) Notice: Subject to any disclaimer, the term of this patent is extended or adjusted under 35 U.S.C. 154(b) by 145 days.

(21) Appl. No.: 13/177,021

(22) Filed: Jul. 6, 2011

(65) Prior Publication Data

US 2012/0033342 A1 Feb. 9, 2012

(30) Foreign Application Priority Data

Aug. 9, 2010 (JP) .................................. 2010-178249

(51) Int. Cl.
*H01G 4/30* (2006.01)

(52) U.S. Cl.
USPC ..................... 361/301.4; 361/301.2; 361/303; 361/305; 361/311; 361/313

(58) Field of Classification Search
USPC ............................. 361/301.4, 301.2, 311–313
See application file for complete search history.

(56) References Cited

U.S. PATENT DOCUMENTS 7,580,241 B2 * 8/2009 Sakashita ...................... 361/313
8,305,730 B2 * 11/2012 Nakayama ................... 361/313

FOREIGN PATENT DOCUMENTS

JP 2001-297945 A1 10/2001

* cited by examiner

*Primary Examiner* — Nguyen T Ha

(74) *Attorney, Agent, or Firm* — Burr & Brown

(57) ABSTRACT

A stacked film capacitor including a resin protective film having excellent durability is provided which can stably secure desired properties. The stacked film capacitor includes a capacitor element including a plurality of dielectric layers, and a plurality of vapor-deposited metal film layers. Each dielectric layer and each vapor-deposited metal film layer are stacked with each other so as to be arranged alternately. The stacked film capacitor further includes a pair of external electrodes provided on opposing side surfaces of the capacitor element, and at least one resin protective film formed on at least one side surfaces other than the side surfaces on which the external electrodes are formed, in which the at least one resin protective film is provided by deposition polymerization.

16 Claims, 8 Drawing Sheets

STACKED FILM CAPACITOR AND METHOD OF PRODUCING THE SAME

The present application is based on Japanese Patent Application No. 2010-178249 filed on Aug. 9, 2010, the contents of which are incorporated herein by reference.

BACKGROUND OF THE INVENTION

1. Field of the Invention

The present invention relates to a film capacitor. More particularly, the present invention relates to an improvement of a stacked film capacitor including a pair of external electrodes that is prepared by a spraying process on a pair of side surfaces of a stacked capacitor element and a resin protective film on a side surface of the remaining side surfaces, and an advantageous method of producing the stacked film capacitor.

2. Description Of Related Art

Conventionally, as one type of film capacitor for use in an electric device, there is known a stacked film capacitor. The stacked film capacitor includes a capacitor element that has a square shape (cuboid or cubic shape) which allows the stacked film capacitor to be surface mounted. Thus, the stacked film capacitor is expected to be increasingly demanded because it can satisfy the demands for smaller film capacitors and high density mounting thereof, which results from recent remarkable downsizing of electric devices.

The stacked film capacitor is generally produced by the following method. Specifically, first, a long capacitor base is formed which includes a plurality of dielectric layers each consisting of a insulating resin film which is formed of polypropylene or polyethylene terephthalate, and a plurality of vapor-deposited metal film layers as internal electrode films, which are stacked with each other so as to be arranged alternately. Second, a pair of external electrodes is formed by a spraying process on side surfaces opposing to each other in a direction perpendicular to the longitudinal direction of the long capacitor base. Subsequently, the long capacitor base is cut into some sections in the longitudinal direction to obtain a plurality of capacitor elements. Then, a terminal or the like is attached to each of the external electrodes of the plurality of capacitor elements and each of the plurality of capacitor elements is contained and sealed in a predetermined case. Thus, a plurality of intended film capacitors are obtained.

Since the plurality of capacitor elements are cut from the capacitor base at one time and used to produce the film capacitor, the film capacitors obtained as above can be efficiently produced. However, if cut surfaces of the capacitor element cut from the capacitor base are left exposed, foreign substance may be attached to the cut surfaces before the capacitor element is contained in the case. It may cause a conduction defect.

In view of the above, as disclosed in JP-A-2001-297945, for example, resin protective films are formed on the cut surfaces of the capacitor element cut out from the capacitor base, i.e., opposing side surfaces of the capacitor element on which no external electrode is formed. By the formation of the resin protective films, it can be prevented that the foreign substance is attached to the side surfaces other than the surfaces on which the external electrodes are formed. Further, it also can be effectively prevented that the conduction defect is caused by the foreign substance. In the film capacitor disclosed in JP-A-2001-297945, the resin protective films are formed on the capacitor element by vacuum deposition. Thus, unlike the case in which the resin protective film is formed by dipping or the like in air, even during the deposition operation of the resin protective film, it can be effectively prevented that foreign substance is attached to the side surfaces of the capacitor element other than the surfaces on which the external electrodes are formed.

However, the conventional film capacitor inherently includes the following problems. Generally, as is well known, since it is difficult to evaporate polymer material, it was not easy to form a polymer thin film by vacuum deposition. Thus, in the conventional film capacitor in which the resin protective film is formed by deposition, the resin protective film is formed of a thin film having a relatively low molecular weight. Consequently, it was difficult to secure the sufficient durability of the resin protective film.

SUMMARY OF THE INVENTION

The present invention has been made in the light of the situations described above, and an object of the invention is to provide a stacked film capacitor that can stably secure desired properties by including resin protective films excellent in durability on side surfaces of a capacitor element other than side surfaces on which external electrodes are formed. It is another object of the present invention to provide a method of advantageously producing the stacked film capacitor.

To achieve the aforementioned objects, or to solve the problems understood from description throughout the present specification and drawings, the present invention may be preferably embodied according to various aspects which will be described below. Each aspect described below may be employed in any combination. It is to be understood that the aspects and technical features of the present invention are not limited to those described below, and can be recognized based on the inventive concept disclosed in the whole specification and drawings.

(1) A stacked film capacitor comprising: a capacitor element including a plurality of dielectric layers and a plurality of vapor-deposited metal film layers, each dielectric layer and each vapor-deposited metal film layer are stacked with each other so as to be arranged alternately, a pair of external electrodes provided on opposing side surfaces of the capacitor element, and at least one resin protective film provided on at least one side surface other than the side surfaces on which the pair of external electrodes are formed, wherein the at least one resin protective film is provided by deposition polymerization.

(2) The stacked film capacitor according to the above aspect (1), wherein the plurality of dielectric layers consists of at least one resin film and at least one vapor-deposited polymer film which is made of the same material as the at least one resin protective film.

(3) The stacked film capacitor according to the above aspect (2), wherein the at least one vapor-deposited polymer film is positioned on at least one of the at least one resin film and one of the plurality of vapor-deposited metal film layers.

(4) The stacked film capacitor according to the above aspect (3), wherein the capacitor element includes a section in which only the at least one vapor-deposited polymer film is positioned between the plurality of vapor-deposited metal film layers.

(5) The stacked film capacitor according to the above aspect (4), wherein the at least one vapor-deposited polymer film positioned between the plurality of vapor-deposited metal film layers has a thickness of 0.01 to 30 μm.

(6) The stacked film capacitor according to the above aspect (3), wherein at least one of the plurality of dielectric layers consists of a composite dielectric layer including the at least one resin film and the at least one vapor-deposited polymer film positioned on at least one surface of the at least one resin film.

(7) The stacked film capacitor according to the above aspect (6), wherein the at least one vapor-deposited polymer film included in the composite dielectric layer has a thickness of 0.001 to 10 μm.

(8) The stacked film capacitor according to any one of the above aspects (1) to (7), wherein the at least one resin protective film has a three-dimensional cross-linked structure.

(9) The stacked film capacitor according to any one of the above aspects (1) to (8), wherein the at least one resin protective film is formed of a polyurea resin film.

(10) The stacked film capacitor according to any one of the above aspects (2) to (9), wherein the at least one vapor-deposited polymer film is formed of a polyurea resin film.

(11) The stacked film capacitor according to any one of the above aspects (2) to (10), wherein at least one side surface other than the side surfaces on which the pair of external electrodes are formed is plasma treated.

(12) The stacked film capacitor according to any one of the above aspects (2) to (11), wherein a dielectric constant of the at least one vapor-deposited polymer film included in the plurality of dielectric layers is higher than that of the at least one resin film.

(13) The stacked film capacitor according to any one of the above aspects (2) to (12), wherein the capacitor element has a structure in which the at least one vapor-deposited polymer film and the plurality of vapor-deposited metal film layers are stacked with each other so as to be arranged alternately on the at least one resin film.

(14) A method of producing a stacked film capacitor comprising the steps of: (a) providing a capacitor element including a plurality of dielectric layers and a plurality of vapor-deposited metal film layers, each dielectric layer and each vapor-deposited metal film layer are stacked with each other so as to be arranged alternately; (b) forming a pair of external electrodes on opposing side surfaces of the capacitor element, and (c) forming at least one resin protective film by deposition polymerization on at least one side surface of the capacitor element other than the side surfaces on which the pair of external electrodes are formed.

The stacked film capacitor of the present invention includes the resin protective film that is formed by vacuum deposition polymerization using a plurality of kinds of raw material monomers. Thus, the resin protective film formed by vacuum deposition polymerization is constituted of a polymer thin film having a higher molecular weight than a film formed by vacuum deposition using a predetermined resin material. Therefore, the resin protective film can have improved durability.

In the stacked film capacitor of the present invention, the resin protective film having excellent durability is surely formed on side surfaces of the capacitor element other than the side surfaces on which the external electrodes are formed. As a result, desired quality and performance can be stably secured for a long time.

Further, according to the method of producing the stacked film capacitor of the present invention, since the resin protective film having excellent durability is surely formed on the side surface of the capacitor element other than the side surfaces on which the external electrodes are formed, the film capacitor which can stably secure desired quality and performance can be advantageously produced.

BRIEF DESCRIPTION OF THE DRAWINGS

The above and other objects, features, advantages and technical and industrial significance of the present invention will be better understood by reading the following detailed description of a preferred embodiment of the invention, when considered in connection with the accompanying drawings, in which.

DETAILED DESCRIPTION OF THE INVENTION

To further clarify the present invention, there will be described in detail embodiments of the present invention with reference to the accompanying drawings.

Figure 1:
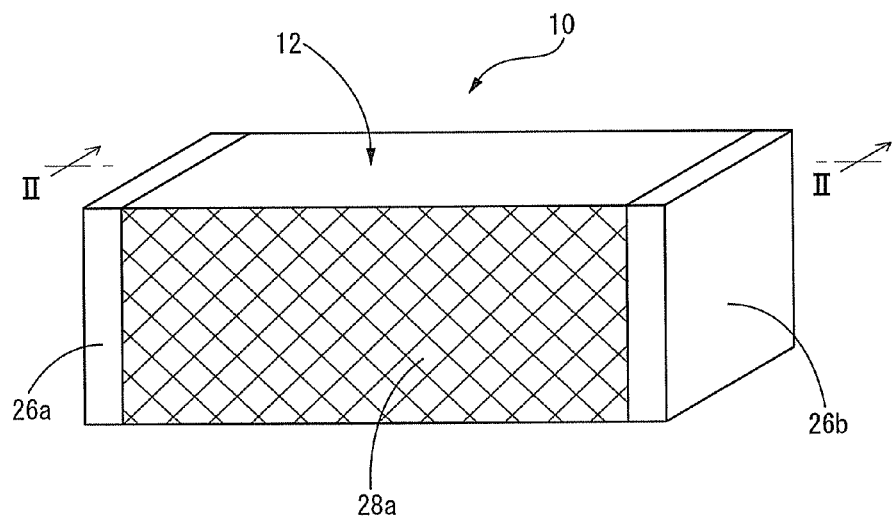
FIG. 1 is a perspective view illustrating one embodiment of a stacked film capacitor having a structure of the present invention.
Figure 2:
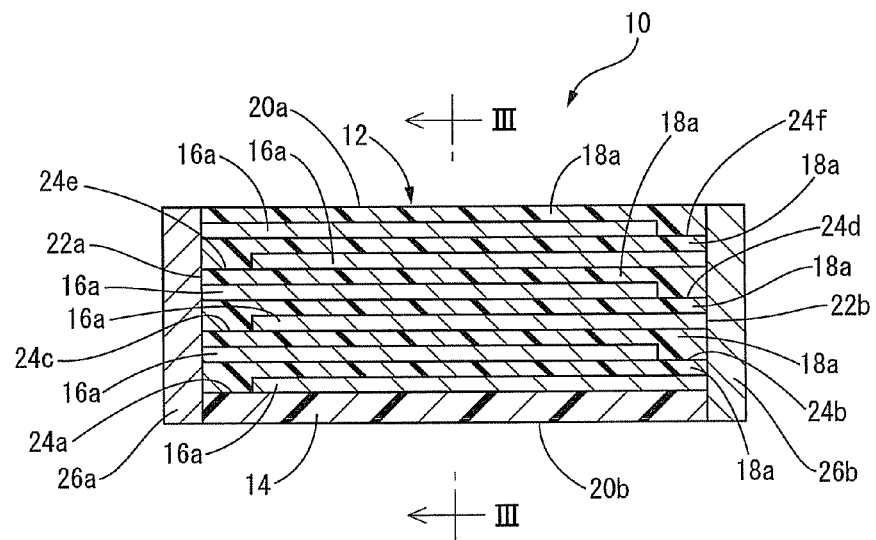
FIG. 2 is a cross sectional view taken along the line II-II in FIG. 1.
Figure 3:
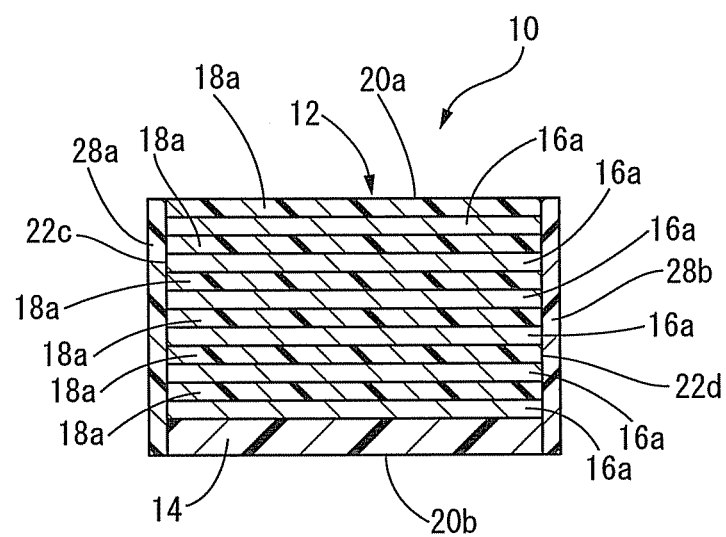
FIG. 3 is a cross sectional view taken along the line in FIG. 2.

Initially, FIG. 1 to FIG. 3 show an embodiment of the stacked film capacitor of the present invention in a perspective view and an axial cross sectional view. As apparent from the figures, the stacked film capacitor (hereinafter, simply referred to as a film capacitor) 10 of the present embodiment includes a capacitor element 12. The capacitor element 12 includes a resin film 14 as a base, a plurality of first vapor-deposited metal film layers 16a (here, six) and a plurality of first vapor-deposited polymer films 18a (here, six). The first vapor-deposited metal film layers 16a and the first vapor-deposited polymer films 18a are formed alternately on the resin film 14.

Here, the resin film 14 of the capacitor element 12 is formed of a stretched film made of polypropylene and has a thickness of about 1 to 10 μm. However, the material of the resin film 14 is not particularly limited to polypropylene. Instead of polypropylene, resin materials such as polyethylene terephthalate, polyphenylene sulfide, polyethylene naphtalate and the like, which are used as materials of resin films of conventional film capacitors, can be suitably employed.

Each of the first vapor-deposited metal film layers 16a on such a resin film 14 functions as an internal electrode film in the film capacitor 10 and is formed by a metal thin film that is formed by conventionally known deposition method performed in vacuum. Material of the first vapor-deposited metal film layer 16a is suitably selected from metallic materials such as aluminum and zinc, which are used to form the internal electrode film of the conventional film capacitor, depending on the material of the resin film 14 or the required performance for the film capacitor 10, for example. The first vapor-deposited metal film layer 16a may be formed by any conventionally known vacuum deposition methods that are in the same category as PVD and CVD. Membrane resistance of the vapor-deposited metal film layer 16a is set at about 1 to 50 $\Omega/cm^2$ and the thickness thereof is suitably determined depending on the membrane resistance, for example.

Each of the first vapor-deposited polymer films 18a functions as a dielectric layer in the film capacitor 10. Here, the first vapor-deposited polymer film 18a is constituted of a polyurea resin thin film that is formed by conventional vacuum deposition polymerization.

Specifically, the first vapor-deposited polymer film 18a is formed by deposition polymerization which form a film by using a polymer generated by polymerizing raw materials (monomers) that are supplied in a gaseous state. Thus, the first vapor-deposited polymer film 18a is constituted of a polymer thin film having a sufficiently higher molecular weight than a vapor-deposited film formed by deposition in which raw materials including predetermined resin materials are evaporated in vacuum. Further, unlike the vapor-deposited film, the first vapor-deposited polymer film 18a can be sufficiently cured without post treatments such as heat treatment or UV treatment. In addition, the thickness of the first vapor-deposited polymer film 18a can be controlled on a nanoscale, which results in an extremely smaller and uniform thickness of the first vapor-deposited polymer film 18a and sufficient reduction in impurities in the film.

Although the thickness of the first vapor-deposited polymer film 18a is not particularly limited, the first vapor-deposited polymer film 18a has generally the thickness of about 0.01 to 30 μm. If the thickness of the first vapor-deposited polymer film 18a is less than 0.01 μm, it may be too thin to secure the sufficient withstand voltage properties. On the other hand, if the thickness of the first vapor-deposited polymer film 18a exceeds 30 μm, it is too thick and the size of the film capacitor may become too big. It is more preferable that the first vapor-deposited polymer film 18a have the thickness of about 0.01 to 10 μm.

The first vapor-deposited polymer film 18a is not particularly limited to the exemplified polyurea resin film. Any known resin film that can form a film by deposition polymerization may be employed. Examples of the resin films include polyamide resin film, polyimide resin film, polyamideimide resin film, polyester resin film, polyazomethine resin film, polyurethane resin film, and acrylic resin film. Among the above listed resin films, one having a higher dielectric constant than the resin film 14 is favorably employed. Due to the formation of the first vapor-deposited polymer film 16a by using such a resin film, the capacitance of the film capacitor 10 can be effectively increased. The resin materials of the resin film 14 and the first vapor-deposited polymer film 18a, which have different dielectric constants, are not limited to the combination of the polypropylene and the polyurea described above.

Of the above-described resin films having high dielectric constant, the polyurea resin film is favorably used to form the first vapor-deposited polymer film 18a. This is because that the polyurea resin does not require the heat treatment in the polymerization of raw material monomers (diisocyanate and diamine) and is formed in the addition polymerization reaction that is completely free from elimination of water, alcohol and the like. Consequently, equipments (facilities) for the heat treatment in the polymerization of raw material monomers is not necessary and cost can be reduced. Further, deformation of the resin film 14 by the heat during the heat treatment can be effectively avoided. Furthermore, there is no need to remove water, alcohol and the like, which are eliminated by the polymerization reaction, from the vacuum chamber in which the polymerization reaction proceeds. Therefore, equipments for the removal is not necessary and cost can be reduced. In addition, the polyurea resin film has an excellent moisture resistance, thereby stably securing a high withstand voltage of the first vapor-deposited polymer film 18a.

In this embodiment, on a surface of each of the plurality of first vapor-deposited polymer films 18a (for example, the surface opposite to the resin film 14 side), a plasma treatment is performed to introduce a three-dimensional cross-linked (net-work) structure to the first vapor-deposited polymer film 18a. By this plasma treatment, withstand voltage and heat resistance of the first vapor-deposited polymer film 18a is advantageously improved. Further, the surface of the first vapor-deposited polymer film 18a is activated, thereby improving the adhesion of the first vapor-deposited polymer film 18a to the first vapor-deposited metal film layer 16a.

Any known process of the plasma treatment for a surface of the first vapor-deposited polymer film 18a can be employed. For example, a process in which plasma generated by using a laser is irradiated on the surface of the first vapor-deposited polymer film 18a can be employed. As an introduction method of the three-dimensional cross-linked structure to the first vapor-deposited polymer film 18a, other than the plasma treatment, a UV treatment, a thermal treatment and other treatments to the first vapor-deposited polymer film 18a can be suitably employed. The UV treatment, the thermal treatment and the other treatments can be performed by using the UV irradiator or heater disposed in the vacuum chamber of the above-described apparatus for producing the capacitor element, for example.

As apparent from FIG. 2 and FIG. 3, the capacitor element 12 has a horizontally long cuboid shape as a whole and includes upper and lower end surfaces 20a, 20b, first and second side surfaces 22a, 22b, and a third and fourth side surfaces 22c, 22d. The upper and lower end surfaces 20a, 22b are opposed to each other in the height direction which is the direction in which the first vapor-deposited metal film layer 16a and the first vapor-deposited polymer film 18a are stacked (vertical direction in FIG. 2 and FIG. 3). The first second side surfaces 22a, 22b are opposed to each other in the longitudinal direction (horizontal direction in FIG. 2), and the third and fourth side surfaces 22c, 22d are opposed to each other in the width direction (horizontal direction in FIG. 3).

The lower end surface 20b is constituted of a lower surface of the resin film 14 and the upper end surface 20a is constituted of an upper surface of the first vapor-deposited polymer film 18a that is positioned at the top of the stack including the first vapor-deposited metal film layers 16a and the first vapor-deposited polymer films 18a that are formed on the resin film 14. Thus, the resin film 14 and the first vapor-deposited polymer film 18a at the top function as protective layers that protect the upper and lower ends of the capacitor element 12.

On one end portion of the resin film 14, which is positioned at the first side surface 22a side of the capacitor element 12, there is a margin portion 24a on which the first vapor-deposited metal film layer 16a is not formed. Further, on end portions, which are positioned at the second side surface 22b side, (the side opposite to the formation portion of the margin portion 24a of the resin film 14) of the first, third and fifth of the first vapor-deposited polymer films 18a from the resin film 14 side, margin portions 24b, 24d, and 24f are, respectively, formed. Further, on end portions at the first side surface 22a side (the same side as the formation portion of the margin portion 24a of the resin film 14) of the second and fourth of the first-vapor deposited polymer films 18a, margin portions 24c and 24e are respectively formed.

As shown in FIG. 1 and FIG. 2, on the first side surface 22a, which is positioned at the margin portions 24a, 24c, 24e side of the capacitor element 12 and on the second side surface 22b, which is positioned at the margin portions 24b, 24d, 24f side, first and second external electrodes 26a, 26b (hereinafter, referred to as first and second external electrodes) prepared by a spraying process are respectively formed. Each of the external electrodes 26a, 26b functions as an external electrode of the capacitor element 12 (film capacitor 10). Each of the first and second external electrodes 26a, 26b is constituted of a metal covering layer that is formed to cover the entire surface of the first and second side surfaces 22a, 22b and that is formed by a conventional thermal spraying using a predetermined metallic material.

Accordingly, of the plurality of the first vapor-deposited metal film layers 16a formed on the resin film 14, the first, third, and fifth first vapor-deposited metal film layers 16a are contacted with or adhered to an inner surface of the second external electrode 26b formed on the second side surface 22b at an end surface thereof positioned opposite to the side adjacent to the margin portions 24a, 24c, 24e, so that there is conduction between the first, third, and fifth of the first vapor-deposited metal film layers 16a and the second external electrode 26b. On the other hand, the second, fourth, and sixth of the first vapor-deposited metal film layers 16a are contacted with or adhered to an inner surface of the first external electrode 26a formed on the first side surface 22a at an end face positioned opposite to the side adjacent to the margin portions 24b, 24d, 24f, so that there is conduction between the second, fourth, and sixth of the first vapor-deposited metal film layers 16a and the first external electrode 26a. One of the first and second external electrodes 26a, 26b is made as a positive electrode, and the other is made as a negative electrode. Further, although not shown in the drawings, on the first and second external electrodes 26a, 26b, terminal or the like may be provided as necessary.

The material for forming the first and second external electrodes 26a, 26b is not particularly limited. The first and second external electrodes 26a, 26b may be formed of different metallic materials, but it is preferable that the material for the first and second external electrodes 26a, 26b be the same kind as the material for the first vapor-deposited metal film layer 16a, and the material for the first external electrode 26a and the second external electrode 26b be the same metallic material. This advantageously enhances the adhesion between the external electrodes 26a, 26b and the first vapor-deposited metal film layers 16a. Further, herein, the dielectric layer of the capacitor element 12 is each constituted of the first vapor-deposited polymer film 18a formed of a resin thin film having a functional group (—OH group or C=O group, for example). As a result, the adhesion between the first vapor-deposited polymer films 18a and the external electrodes 26a, 26b is effectively improved based on hydrogen bonding or Van der Waals force. Consequently, it can be advantageously prevented that the external electrodes 26a, 26b are separated from the capacitor element 12.

As shown in FIG. 1 and FIG. 3, a first resin protective film 28a and a second resin protective film 28b are formed on the third side surface 22c and the fourth side surface 22d of the capacitor element 12, respectively, so as to cover the entire thereof. Thus, it can be prevented that foreign substance is attached to the third and fourth side surfaces 22c, 22d of the capacitor element 12, on which the first and second external electrodes 26a, 26b are not formed.

The film capacitor 10 of the present embodiment includes the stacked capacitor element 12 in which the first vapor-deposited metal film layers 16a and the first vapor-deposited polymer films 18a are formed on the resin film 14 such that the first vapor-deposited polymer film 18a is positioned between the adjacent vapor-deposited metal film layers 16a, 16a. Further, on the side surface 22a, 22b of the capacitor element 12, which are opposed to each other, the first and second external electrodes 26a, 26b are formed, and on the side surfaces 22c, 22d on which the first and second external electrodes 26a, 26b are not formed, the first and second resin protective films 28a, 28b are respectively formed.

Especially, each of the first and second resin protective films 28a, 28b is formed of a polyurea resin thin film that is formed of a polymer generated in a vacuum by conventional deposition polymerization. Thus, like the first vapor-deposited polymer film 18a, the first and second resin protective films 28a, 28b are each constituted of a polymer thin film having a sufficiently higher molecular weight than a vapor-deposited film formed by deposition in which a raw material consisting of a predetermined resin material is evaporated in vacuum. Further, unlike the vapor-deposited film, the first and second resin protective films 28a, 28b can be sufficiently cured without post treatments such as heat treatment or UV treatment. In addition, the thickness of the first and second resin protective films 28a, 28b can be controlled on a nanoscale, which results in an extremely smaller and uniform thickness of the first vapor-deposited polymer film 18a and sufficient reduction in impurities in the films.

The thickness of the first and second resin protective films 28a, 28b formed by deposition polymerization is not particularly limited. However, the first and second resin protective films 28a, 28b generally have the thickness of about 1 to 50 μm. If the thickness of the resin protective films 28a, 28b is as small as less than 1 μm, insulation breakdown may be caused by moisture soaked into the capacitor element 12, or breakdown may be caused depending on treatment in later process due to insufficient mechanical strength. On the other hand, if the thickness of the first vapor-deposited polymer film 18a is as large as more than 50 μm, the productivity may be deteriorated, raw material cost may be raised, or size of the film capacitor 10 may be increased.

The first and second resin protective films 28a, 28b are not particularly limited to the exemplified polyurea resin film. Any known resin film that can form a film by vacuum deposition polymerization may be employed. Examples of the resin films include polyamide resin film, polyimide resin film, polyamideimide resin film, polyester resin film, polyazomethine resin film, polyurethane resin film, and acrylic resin film. The first resin protective film 28a and the second resin protective film 28b may be constituted by different kinds of resin films.

Although the first and second resin protective films 28a, 28b may be formed of a material that is different from the material forming the first vapor-deposited polymer film 18a of the capacitor element 12, it is preferable that the first and second resin protective films 28a, 28b and the first vapor-deposited polymer film 18a are formed of the same kind of materials. By the use of the same kinds of the materials, adhesion between the first and second resin protective films 28a, 28b and the first vapor-deposited polymer film 18a is improved, thereby effectively preventing that the first and second resin protective films 28a, 28b are separated from the third and second side surfaces 22c, 22d of the capacitor element 12.

In the present embodiment, due to the formation of the first and second resin protective films 28a, 28b by the same polyurea resin film as the first vapor-deposited polymer film 18a, not only the adhesion between the first and second resin protective films 28a, 28b and the first vapor-deposited polymer film 18a is improved, but also equipments (facilities) for the heat treatment in the polymerization of raw material monomers (diisocyanate and diamine) and equipments for the removal of excess product in polymerization reaction from a vacuum chamber are not necessary, thereby reducing the cost. Further, deformation of the resin film 14 by the heat during the heat treatment can be effectively avoided, because there is no need to perform a heat treatment.

Further, in the present embodiment, a plasma treatment is performed on a surface of each of the first and second resin protective films 28a, 28b to introduce a three-dimensional cross-linked (net-work) structure to the first and second resin protective films 28a, 28b. By this treatment, the withstand voltage and heat resistance of the first and second resin protective films 28a, 28b is advantageously improved. Further, the surface of each of the first and second resin protective films 28a, 28b is activated, thereby improving the adhesion of the first and second resin protective films 28a, 28b to the first vapor-deposited polymer film 18a and the first vapor-deposited metal film layer 16a.

As a specific process of the plasma treatment for a surface of the first and second resin protective films 28a, 28b, any known process can be employed. For example, like the plasma treatment for the surface of the first vapor-deposited polymer film 18a, plasma generated by using a laser can be irradiated on the surface of the first and second resin protective films 28a, 28b. As an introduction method of the three-dimensional cross-linked structure to the first and second resin protective films 28a, 28b, other than the plasma treatment, a UV treatment, a thermal treatment, electron beam and other treatments to the first and second resin protective films 28a, 28b can be suitably employed.

The film capacitor 10 of the present embodiment having the above-described structure is produced in accordance with the following method, for example.

Initially, the resin film 14 having an elongated shape is disposed in the inside of a vacuum chamber and the vacuum chamber is made to be in a vacuum state by reducing the pressure therein to be in a range of about $10^{-5}$ to 100 Pa. Then, a deposition operation using a deposition material consisting of a predetermined metallic material and deposition polymerization using diisocyanate and diamine, which are raw materials (monomers) of the polyurea resin thin film, are repeatedly performed in turn in accordance with the conventional procedure. The deposition operation is performed before the deposition polymerization. Further, the margin portions 24a to 24f are formed on the resin film 14 and the first vapor-deposited polymer films 18a (except for the first vapor-deposited polymer film 18a positioned at the top).

Thus, a capacitor base having an elongated shape is obtained which includes the resin film 14, and the first vapor-deposited metal film layers 16a and the first vapor-deposited polymer films 18a, which are alternately formed on the resin film 14 in the order of the description. Then, for example, the first external electrode 26a and the second external electrode 26b are formed on opposing side surfaces of the capacitor base, i.e., the first side surface 22a and the second side surface 22b, respectively, by a thermal spraying using the same metallic material as the first vapor-deposited metal film layer 16a.

Then, the capacitor base having an elongated shape provided with the first and second external electrodes 26a, 26b is cut into a plurality of sections in the longitudinal direction thereof (a direction perpendicular to both of the opposing direction of the first side surface 22a and the second side surface 22b and the stacking direction of the first vapor-deposited metal film layer 16a and the first vapor-deposited polymer film 18a). Thus, a plurality of capacitor elements 12 are produced in which the first and second external electrodes 26a, 26b are respectively formed on the first and second side surfaces 22a, 22b and the cut surfaces of the capacitor base are provided as the third and fourth side surfaces 22c, 22d which are respectively adjacent to the first and second side surfaces 22a, 22b.

Subsequently, the first and second resin protective films 28a, 28b are formed on the third and fourth side surfaces 22c, 22d of the capacitor element 12 obtained as above. The first and second resin protective films 28a, 28b are formed by using a deposition system 30 having a structure shown in FIG. 4, for example.

Figure 4:
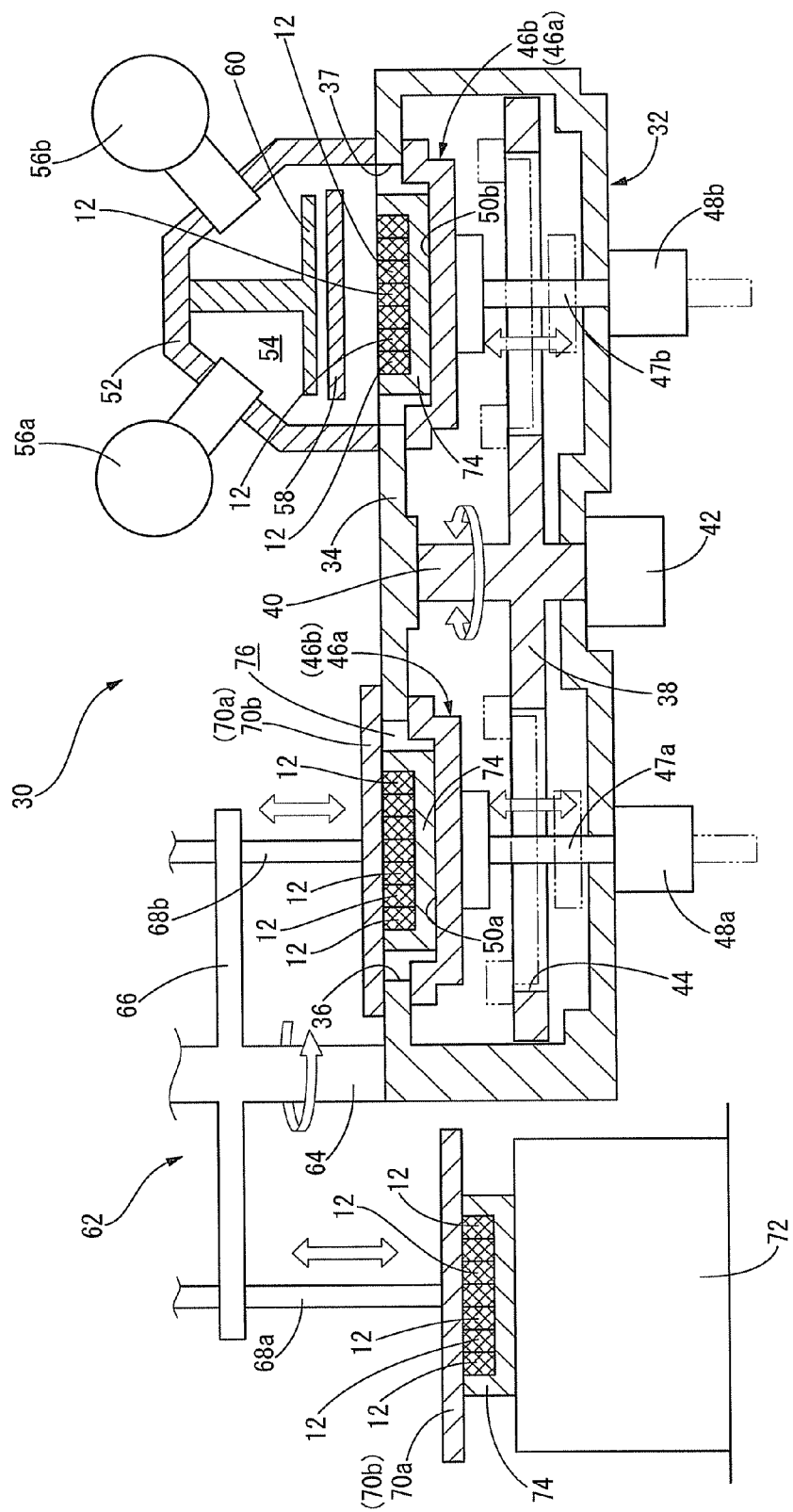
FIG. 4 is a view showing a deposition system for forming a resin protective film on the capacitor element shown in FIG. 1.

As apparent from FIG. 4, the deposition system 30 includes a vacuum chamber 32. The pressure in the vacuum chamber 32 is constantly controlled to be about $10^{-5}$ to 100 Pa, which is substantially the same pressure as the pressure in the vacuum chamber during the formation of the first vapor-deposited polymer film 18a. The vacuum chamber 32 has a circular shape as a whole and includes a top board 34 having a circular plate shape. Then, at left and right sides in FIG. 4 with the top board 34 therebetween, a left window 36 and a right window 37 are provided so as to penetrate through the top board 34. Hereinafter, the horizontal direction in FIG. 4 and the vertical direction in FIG. 4 are simply referred to as the horizontal direction and the vertical direction, respectively.

In the vacuum chamber 32, a rotating table 38 having a circular shape is disposed in a rotatable manner around a rotation axis 40 which extends in the vertical direction at the center section of the vacuum chamber 32. The rotation axis 40 is connected to a rotary driving device 42, which is an electric motor, for example. The rotary driving device 42 can be rotationally driven both forwardly and reversely. Thus, the rotating table 38 is rotated forwardly or reversely around the rotation axis 40 with the forward or reverse rotation drive of the rotary driving device 42 in the vacuum chamber 32.

The rotating table 38 includes a through hole 44. Although not shown in FIG. 4, the through hole 44 extends in the circumferential direction of the rotating table beyond half the length of the circumference. Each of end portions in the circumferential direction of the through hole 44 respectively corresponds to the left and right windows 36, 37 of the top board 34.

Further, at positions above the rotating table 38 in the vacuum chamber 32 which correspond the left and right window 36, 37, support tables 46a, 46b are disposed in a movable manner in the vertical direction. The support tables 46a, 46b can be moved up and down by lifts 48a, 48b provided with rods 47a, 47b which extend in the vertical direction through the end portions in the circumferential direction of the through hole 44 of the rotating table 38.

At the middle area of the upper surface of each of the support tables 46a, 46b, a recess is provided. The bottom inner surface of the recess is referred to as a flat support surface 50a, 50b. The support tables 46a, 46b are each moved up by the lift 48a, 48b to contact a periphery of a lower opening of the left and right windows 36, 37 at an upper outer circumferential portion thereof. As a result, the lower opening of each of the left and right windows 36, 37 is closed. Further, as indicated by two-dotted chain line in FIG. 4, the support tables 46a, 46b are moved down by the lifts 48a, 48b to engage with a periphery of the upper opening of the through hole 44 at a lower outer circumferential portion thereof. As a result, the support tables 46a, 46b are retained by the rotating table 38.

As described above, the lower opening of each of the left and right windows 36, 37 is closed or opened with the up or down movement of the support tables 46a, 46b by the lifts 48a, 48b. Further, every time the rotating table 38 is half-turned in the forward or reverse direction after the lifts 48a, 48b are moved down and each of the support tables 46a, 46b is retained by the rotating table 38, for example, the position of each of the support tables 46a, 46b is changed alternately from the position corresponding to the left window 36 to the position corresponding to the right window 37.

Further, above the top board 34 of the vacuum chamber 32, a cover 52 having a substantially dome-shape is fixed so as to cover the right window 37. The inner space defined by the cover 52 is referred to as a deposition chamber 54. When the lower opening of the right window 37 is closed by one of the support tables 46a, 46b that is positioned at the right side, the deposition chamber 54 is disconnected from the vacuum chamber 32 and the inside of the deposition chamber 54 is hermetically sealed.

The cover 52 is provided with two monomer pots 56a, 56b. In the two monomer pots 56a, 56b, a predetermined amount of diisocyanate and diamine as raw material monomers of the polyurea resin film are separately contained. The diisocyanate and diamine contained in each of the two monomer pots 56a, 56b is evaporated by heating with a heating device, which is not shown.

Thus, in the hermetically sealed deposition chamber 54, the vacuum deposition polymerization is performed to form the first and second resin protective films 28a, 28b formed of the polyurea resin film. In the deposition chamber 54, there are disposed a diffuser panel 58, which is used for diffusing and mixing the diisocyanate and diamine evaporated by the vacuum deposition polymerization, and a plasma electrode 60, which is used for performing a predetermined plasma treatment.

On the top board 34, a transfer machine 62 is disposed. The transfer machine 62 includes a rotation axis 64, which extends in the vertical direction at the left end of the top board 34, a retaining bar 66, which extends in the horizontal direction from the rotation axis 64, lifting rods 68a, 68b, which are respectively attached to horizontally end portions of the retaining bar 66 in a movable manner in the vertical direction, and jig chuckers (chucking devices) 70a, 70b, which are respectively fixed to end portions of the lifting rods 68a, 68b. The jig chuckers 70a, 70b are arranged such that one of them is positioned on a changing table 72, which is disposed outside of the vacuum chamber 32, and the other is positioned on the left window 36 of the top board 34 of the vacuum chamber 32.

The rotation axis 64 is connected to a rotary driving device such as an electric motor, which is not shown, and the retaining bar 66 is rotated about the rotation axis 64 by the operation of the rotary driving device. Thus, every time the retaining bar 66 is half-turned about the rotation axis 64, the position of each of the jig chuckers 70a, 70b is changed in turn from the position on the changing table 72 to the position on the left window 36 of the top board 34.

Further, the lifting rods 68a, 68b are connected at the top thereof to a lifting machine, which is not shown. By the operation of the lifting machine, the jig chuckers 70a, 70b fixed at the lower ends of the lifting rod 68a, 68b are moved up or down. Further, each of the jig chuckers 70a, 70b includes a retaining apparatus (not shown) such as electromagnet, for example. The electromagnet as a retaining apparatus allows a housing jig 74, which contains the capacitor elements 12 in the inside thereof and is constituted of a magnetic material, to be retained by the adsorption thereof, and by the interruption of supply of electric current to the electromagnet, the retention of the housing jig 74 by the jig chuckers 70a, 70b is cancelled.

Thus, as shown in FIG. 4, the transfer machine 62 is arranged to transfer the housing jig 74, which is retained by the jig chucker 70a (70b), from the top surface of the changing table 72 to the support surface 50a (50b) of the support table 46a (46b), which closes the lower opening of the left window 36 of the vacuum chamber 32, or vice versa, by half-turning the retaining bar 66 while the housing jig 74 is retained by the jig chucker 70a (70b). Further, when the housing jig 74 retained by the jig chucker 70a (70b) is transferred on the support surface 50a (50b) of the support table 46a (46b), the upper opening of the left window 36 of the vacuum chamber 32 is also covered by the jig chucker 70a (70b) to hermetically seal the internal space of the left window 36. The hermetically sealed space of the left window 36 provides a load lock chamber 76. The pressure in the load lock chamber 76 is reduced separately from the vacuum chamber 32 by a vacuum pump, which is not shown, so that the load lock chamber 76 is in a desired vacuum state. By this arrangement, the housing jig 74 can be effectively and quickly transferred into the deposition chamber 54 or onto the top surface of the changing table 72 without breaking the vacuum state of the vacuum chamber 32.

Figure 5:
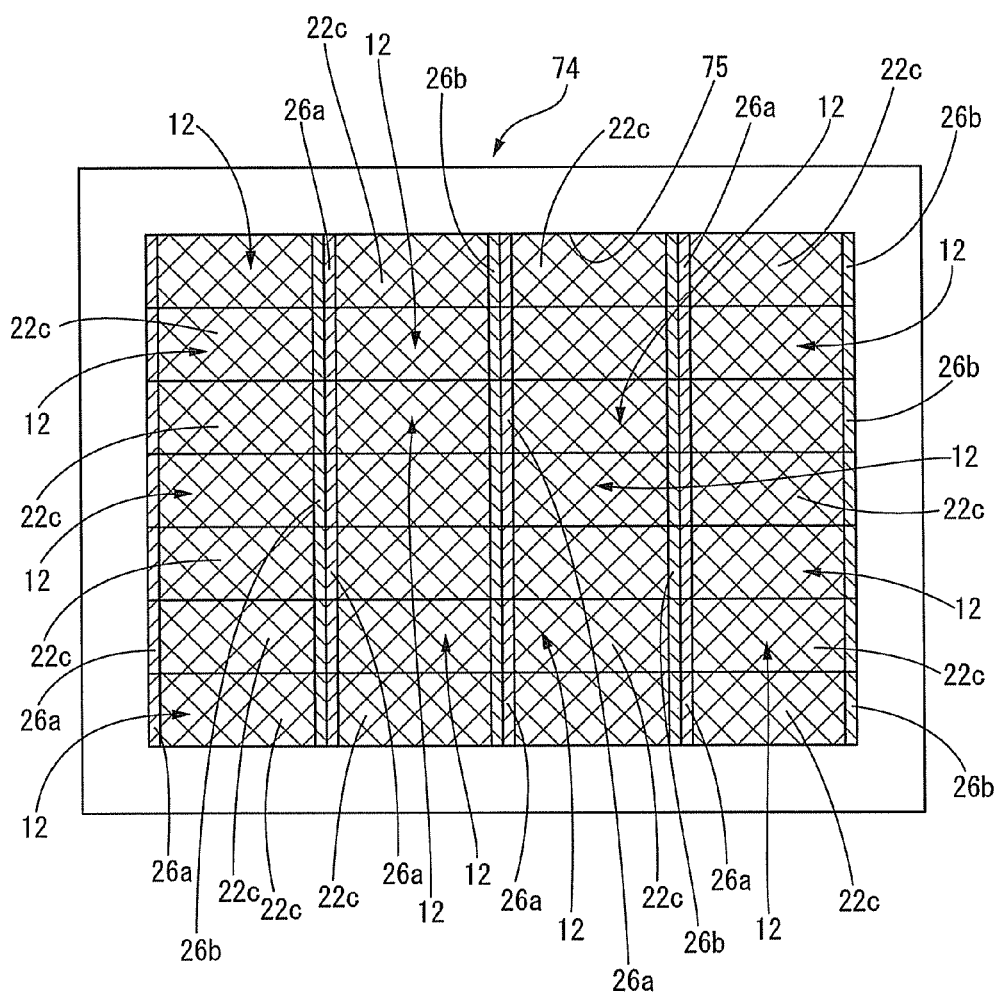
FIG. 5 is a view showing a state in which a plurality of capacitor elements are contained and set in a housing jig of the deposition system shown in FIG. 4.

When the first and second resin protective films 28a, 28b are formed on the third and fourth side surfaces 22c, 22d of the capacitor element 12 by using the deposition system 30 having the above-described structure, initially, as shown in FIG. 4 and FIG. 5, a plurality of capacitor elements 12 (here, twenty eight) are contained in a recess 75 of the housing jig 74 having a rectangular box shape open upwardly. At this time, all of the capacitor elements 12 are arranged in the recess 75 such that one of the third side surface 22c and the fourth side surface 22d (here, the third side surface 22c) is exposed to the outside through the opening. It is to be understood that the third side surfaces 22c of the capacitor elements 12 and the first and second external electrodes 26a, 26b are hatched in FIG. 5 for ease of distinction.

Then, as shown in FIG. 4, after the housing jig 74 containing the capacitor elements 12 is transferred on the changing table 72, the lifting rod 68a of the transfer machine 62 of the deposition system 30 is moved downwardly, thereby retaining the housing jig 74 by the jig chucker 70a. Meanwhile, the support tables 46a, 46b in the deposition system 30 are moved upwardly to close the lower opening of the left and right windows 36, 37 of the top board 34, and the internal space of the vacuum chamber 32 is made to be in a vacuum state by reducing the pressure therein to be about $10^{-5}$ to 100 Pa, for example.

Then, the lifting rod 68a is moved up and the rotation axis 64 of the transfer machine 62 is half-turned. After that, the lifting rod 68a is moved down so that the housing jig 74 retained by the jig chucker 70a is transferred onto the support table 46a, which closes the lower opening of the left window 36 of the vacuum chamber 32, to be retained by the support table 46. At this time, the upper opening of the left window 36 is closed by the jig chucker 70a so that the inside of the left window 36 provides the load lock chamber 76. Further, the jig chucker 70b fixed at the lower end of the lifting rod 68b is disposed on the changing table 72 instead of the jig chucker 70a.

Then, the internal space of the load lock chamber 76 is made to be in a vacuum state by reducing the pressure therein to substantially the same pressure in the vacuum chamber 32. Meanwhile, another housing jig 74 containing the capacitor elements 12 is transferred on the changing table 72 and the housing jig 74 is retained by the jig chucker 70b disposed on the changing table 72.

After the retention of the housing jig 74 by the jig chucker 70a is cancelled, both of the support tables 46a, 46b are moved down and the rotating table 38 is half-turned in one direction (for example, in a clockwise direction). As a result, the support table 46a is positioned under the right window 37 and the support table 46b is positioned under the left window 36. During the turn of the rotating table 38, although the load lock chamber 76 is opened to the vacuum chamber 32, the internal space of the vacuum chamber 32 is kept to be in reduced pressure, because the upper opening of the left window 36 is closed by the jig chucker 70a.

Then, the support table 46a is moved up to close the lower opening of the right window 37, thereby hermetically sealing the deposition chamber 54. As a result, the housing jig 74 supported by the support table 46a is contained in the deposition chamber 54 and the third side surfaces 22c of the capacitor elements 12 contained in the housing jig 74 are exposed to the internal space of the deposition chamber 54. Further, the other support table 46b is moved up to close the lower opening of the left window 36.

Then, electric current is applied to the plasma electrode 60 to generate plasma in the deposition chamber 54. Thus, plasma irradiation is performed on the third side surface 22c of each of the plurality of capacitor elements 12 contained in the housing jig 74. As a result, plasma treatment is performed on the end surface of each of the first vapor-deposited polymer films 18a, which is exposed at the third side surface 22c, to activate the end surface, thereby improving the adhesion between the end surface, i.e., the third side surface 22c, and the first resin protective film 28a. Further, a three dimensional cross-linked structure is introduced into the end surface of each of the first vapor-deposited polymer films 18a to improve the withstand voltage and the heat resistance.

Subsequently, diisocyanate and diamine contained in the two monomer pots 56a, 56b are heated by a heating apparatus, which is not shown, and evaporated, whereby the evaporated diisocyanate and diamine are introduced into the deposition chamber. Then, the evaporated diisocyanate and diamine are deposited on the third side surface 22c of the capacitor element 12 and polymerized thereon. Thus, the vapor-deposited polymerization process is performed in the vacuum chamber 54. As a result, the first resin protective film 28a formed of a polyurea resin film is formed on the third side surface 22c of the capacitor element 12. In other words, the deposition operation of the first resin protective film 28a is performed on the third side surface 22c. At the time of introduction, the evaporated diisocyanate and diamine are collided with the diffuser panel 58 in the deposition chamber 54, thereby being diffused and mixed.

After the formation of the first resin protective film 28a on the third side surface 22c, electric current is applied to the plasma electrode to generate plasma in the deposition chamber 54 and the plasma is irradiated on the first resin protective film 28a. By this irradiation of plasma, the plasma treatment is performed on the first resin protective film 28a to introduce a three dimensional cross-linked structure into the first resin protective film 28a.

During the deposition operation of the first resin protective film 28a, the jig chucker 70a, which does not retain the housing jig 74 is transferred onto the changing table 72 and the housing jig 74 containing the capacitor elements 12 therein that is retained by the other jig chucker 70b is transferred onto the support surface 50b of the support table 46b which closes the lower opening of the left window 36. After the formation of the load lock chamber 76 again in which the housing jig 74 is disposed therein, the pressure in the load lock chamber 76 is reduced to substantially the same pressure as the pressure in the vacuum chamber 32. The above operations are finished by the end of the deposition operation performed by the above deposition polymerization. That is, the deposition operation of the first resin protective film 28 on the third side surface 22c of each of the capacitor elements 12 contained in the housing jig 74 and the operation for disposing the capacitor elements 12 contained in the housing jig 74 into the load lock chamber 76, i.e., preparation for next deposition operation are performed simultaneously.

Then, after the deposition operation of the first resin protective film 28a, the housing jig 74 supported by the support table 46b which closes the lower opening of the left window 36 is released from the jig chucker 70b. Subsequently, both of the support tables 46a and 46b are moved down and the rotating table 38 is half-turned in the reverse direction. As a result, the support table 46a supporting the housing jig 74 containing the capacitor elements 12 on which the first resin protective film 28a is formed on the third side surface 22c is located under the left window 36 again, and the support table 46b supporting the housing jig 74 containing the capacitor elements 12 on which the deposition operation will be performed is located under the right window 37 again.

Then, the support table 46b is moved up so that the capacitor elements 12 in the housing jig 74 supported by the support table 46b are contained in the deposition chamber 54. Subsequently, like the above, the deposition operation of the first resin protective film 28a by deposition polymerization is performed on the third side surface 22c of the capacitor elements 12.

Meanwhile, as the support table 46b, the support table 46a is also moved up to close the lower opening of the left window 36 by the support table 46a, thereby providing the load lock chamber 76 in which the housing jig 74 supported by the support table 46a is disposed therein. Then, after the housing jig 74 in which the capacitor elements 12 having the first resin protective film 28a thereon is retained by the jig chucker 70b and the inside of the load lock chamber 76 is returned to the air pressure, the retaining bar 66 of the transfer machine 62 is half-turned. Consequently, the housing jig 74 retained by the jig chucker 70b is disposed on the changing table 72. Then, the capacitor elements 12 on which the first resin protective film 28a is formed on the third side surface 22c is taken out from the recess 75 of the housing jig 74 which is released from the jig chucker 70b. A series of operations from the moving up of the support table 46a to the change of the housing jig 74 retained by the jig chucker 70b is performed concurrently with a series of operations from the moving up of the support table 46b to the end of the above deposition operation.

Subsequently, the capacitor elements 12 on which the first resin protective film 28a is formed at the third side surface 22c are contained in the recess 75 of the housing jig 74 again such that the fourth side surface 22d is exposed to the outside through the opening of the recess 75 of the housing jig 74. Then, after the housing jig 74 is transferred onto the changing table 72, the above-described transfer operation and deposition operation are performed to form the second resin protective film 28b on the fourth side surface 22d of each of the capacitor elements 12. Therefore, a plurality of intended film capacitors 10 are obtained at one time. Then, as necessary, a terminal is attached to each of the external electrodes 26a, 26b of the film capacitors 10 and then each of the film capacitors 10 is sealed in a predetermined case.

As described above, in the film capacitor 10 of the present embodiment, the first and second resin protective films 28a, 28b formed by deposition polymerization in the vacuum are respectively formed on the third and fourth side surfaces 22c, 22d, which are cut surfaces of the capacitor base having an elongated shape. Thus, not only after the formation of the first and second resin protective films 28a, 28b, but also during the formation thereof, it can be effectively prevented that foreign substance is attached to the third and fourth side surfaces 22c, 22d, on which the first and second external electrodes 26a, 26b are not formed. Thus, it can be advantageously prevented that the conduction defect is caused by the foreign substance.

Further, in the film capacitor 10, since the first and second resin protective films 28a, 28b are formed by deposition polymerization, the molecular weight of each of the first and second resin protective films 28a, 28b is higher than the vapor-deposited film formed by the vacuum deposition, for example. Thus, the durability of the first and second resin protective films 28a, 28b is advantageously improved.

As a result, in the film capacitor 10 of the present embodiment, excellent quality that is free from conduction defect can be stably secured for longer time.

In the film capacitor 10, the plasma treatment is performed on the surface of each of the first and second resin protective films 28a, 28b to introduce the three dimensional cross-linked structure to the first and second resin protective films 28a, 28b, thereby improving the heat resistance and durability of the first and second resin protective films 28a, 28b. As a result, the stability of quality of the film capacitor 10 can be more advantageously improved.

Further, in the present embodiment, the plasma treatment is performed on the end surfaces of the first vapor-deposited polymer films 18a, which are exposed at the third and fourth side surfaces 22c, 22d, thereby improving the adhesion of the first vapor-deposited polymer films 18a to the first and second resin protective films 28a, 28b. Thus, it can be advantageously prevented that the first and second resin protective films 28a, 28b are separated from the end surfaces of the first vapor-deposited polymer film 18a and from the third and fourth side surfaces 22c, 22d, thereby further improving the durability of the film capacitor 10.

In the film capacitor 10 of the present embodiment, since the first and second resin protective films 28a, 28b are each formed by deposition polymerization, unlike the case in which the first and second resin protective films 28a, 28b are each formed by the vacuum deposition, the first and second resin protective film 28a, 28b can be surely cured without extra processes such as heat treatment, UV irradiation treatment and the like. Thus, in the formation of the first and second resin protective films 28a, 28b, eventually in the production of the film capacitor 10, extra equipment such as heating apparatus and UV irradiation apparatus is not required. As a result, the film capacitor 10 can be produced at a sufficiently low cost and with excellent productivity.

Further in the film capacitor 10 of the present embodiment, the first vapor-deposited metal film layers 16a and the first vapor-deposited polymer films 18a are formed on the resin film 14 such that each of the first vapor-deposited polymer films 18a having a sufficient smaller thickness than the resin film 14 is positioned between the adjacent first vapor-deposited metal film layers 16a, 16a. By this arrangement, unlike the film capacitor including the resin films and the vapor-deposited metal film layers which are alternately formed, the film capacitor 10 can be made smaller and the capacitance thereof can be effectively increased without making the thickness of the resin film 14 extremely smaller and without reducing the impurities in the material of the resin film 14.

By the method of producing the film capacitor 10 described above, a plurality of the intended film capacitors 10 can be obtained at one time, and also the deposition operation of the first and second resin protective films 28a, 28b can be performed concurrently with the preparation for the deposition operation due to the use of the above-described deposition system 30. Further, the deposition operation of the first and second resin protective films 28a, 28b can be performed concurrently with the transfer operation of the capacitor elements 12 on which the deposition was performed. As a result, the production cycle of the intended film capacitors 10 can be effectively shortened.

In the present invention, as long as the capacitor element includes the dielectric layers and the vapor-deposited metal film layers which are each alternately formed, the laminated structure is not particularly limited. The capacitor element constituting the film capacitor of the present invention may have a laminated structure shown in FIG. 6 to FIG. 10, for example. With respect to the capacitor elements included in the film capacitors which will be described later, the same reference numerals as used in FIG. 1 to FIG. 3 are used for members and portions having the same structures as those of the capacitor element 12 constituting the film capacitor 10 of the first embodiment, and a detailed explanation of which is dispensed with.

Figure 6:
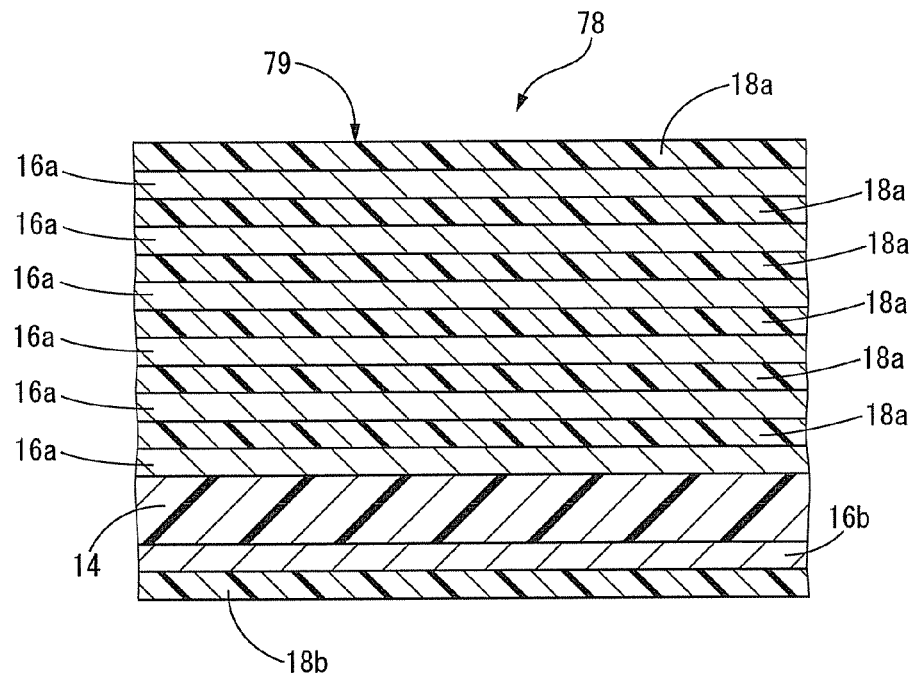
FIG. 6 is a partially enlarged cross sectional view showing another embodiment of the film capacitor having a structure of the present invention.

Initially, a capacitor element 79 included in the film capacitor 78 shown in FIG. 6 includes the first vapor-deposited metal film layers 16a and the first vapor-deposited polymer films 18a that are each alternately formed on one surface of the resin film in the order of the description. On the other surface of the resin film 14, a second vapor-deposited metal film layer 16b is formed. Further, on a surface of the second vapor-deposited metal film layer 16b positioned at the side opposite to the resin film 14, a second vapor-deposited polymer film 18b is formed. The second vapor-deposited metal film layer 16b is formed by vacuum deposition using the same metallic material as the first vapor-deposited metal film layer 16a. Further, like the first vapor-deposited polymer film 18b, the second vapor-deposited polymer film 18b consists of the resin thin film formed by vacuum deposition polymerization described as above. The material or thickness of the second vapor-deposited metal film layer 16b and the second vapor-deposited polymer film 18b may be the same as that of the first vapor-deposited metal film layer 16a or the first vapor-deposited polymer film 18a, or may be different. The same can be applied to the first and second vapor-deposited metal film layers 16a, 16b or the first and second vapor-deposited polymer films 18a, 18b included in film capacitors 80, 83, 86, 89 shown in FIG. 7 to FIG. 10, which will be explained below.

Although not shown in drawings, the first and second external electrodes (26a, 26b) are formed on the first and second side surfaces (22a, 22b), which are opposed to each other, and the first and second resin protective films (28a, 28b) formed by deposition polymerization are respectively formed on the third and fourth side surfaces (22c, 22d) which are the cut surfaces of the capacitor base having an elongated shape, thereby constituting the film capacitor 78. Further, each of the resin film 14 and the first vapor-deposited polymer films 18a has the above-described margin portion (24). Although not described in the following explanation of the film capacitors 80, 83, 86, 89 shown in FIG. 7 to FIG. 10 in these film capacitors 80, 83, 86, 89, the first and second external electrodes (26a, 26b) are formed on the first and second side surfaces (22a, 22b) and the first and second resin protective films (28a, 28b) formed by deposition polymerization are respectively formed on the third and fourth side surfaces (22c, 22d), and further each of the resin film 14 and the first vapor-deposited polymer film 18a has the margin portion (24).

In the film capacitor 78 including the capacitor element 79 having the above-described structure, the resin film 14 as a base functions as a dielectric layer like the first vapor-deposited polymer film 18a which is positioned between two first vapor-deposited metal film layers 16a, 16a. Accordingly, in addition to the advantages obtained by the formation of the first and second resin protective films (28a, 28b) formed by deposition polymerization on the third and fourth side surfaces (22c, 22d), which are not shown, capacitance can be effectively increased.

Figure 7:
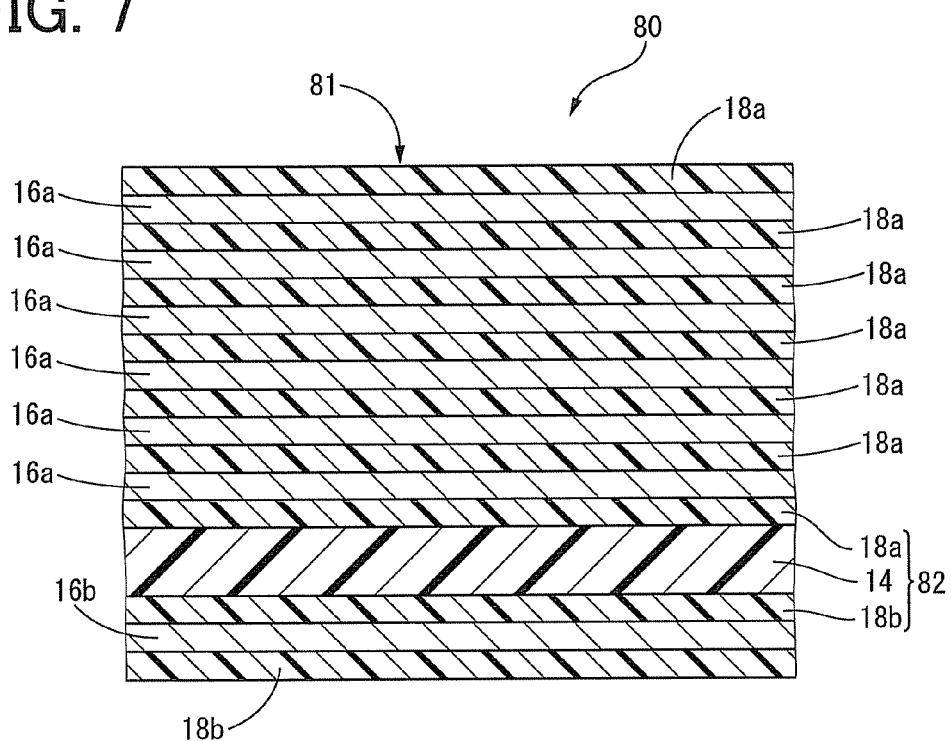
FIG. 7 is a partially enlarged cross sectional view showing a further embodiment of the film capacitor having a structure of the present invention.

A capacitor element 81 included in the film capacitor 80 shown in FIG. 7 includes the first vapor-deposited polymer film 18a on one surface of the resin film 14 and the second vapor-deposited polymer film 18b on the other surface thereof. That is, here, the base of the capacitor element 81 is constituted by a composite dielectric layer 82 in which the first and second vapor-deposited polymer films 18a, 18b are formed on each surface of the resin film 14. The surface smoothness of the resin film 14 can be advantageously improved by the formation of the first and second vapor-deposited polymer films 18a, 18b on each surface of the resin film 14.

Then, on the surface of the first vapor-deposited polymer film 18a of the composite dielectric layer 82, which is not the side of the resin film 14, the first vapor-deposited metal film layers 16a and another first vapor-deposited polymer films 18a are formed so as to be arranged alternately in the order of the description. Further, on the surface of the second vapor-deposited polymer film 18b of the composite dielectric layer 82, which is not the side of the resin film 14, the second vapor-deposited metal film layer 16b and another second vapor-deposited polymer film 18b are formed so as to be arranged in the order of the description.

The first and second vapor-deposited polymer films 18a, 18b included in the composite dielectric layer 82 are formed of the same resin thin films as the first and second vapor-deposited polymer films 18a, 18b that are formed on each side surface of the composite dielectric layer 82 with the first and second vapor-deposited metal film layers 16a, 16b therebetween. It is preferable that the thickness of each of the first and second vapor-deposited polymer films 18a, 18b included in the composite dielectric layer 82 is about 0.001 to 10 μm. It is difficult to make the thickness of the first and second vapor-deposited polymer films 18a, 18b less than 0.001 μm, so that the thickness of the first and second vapor-deposited polymer films 18a, 18b practically becomes 0.001 μm or more. Further, even if the thickness of the first and second vapor-deposited polymer films 18a, 18b included in the composite dielectric layer 82 is made to be more than 10 μm, the improvement of the surface smoothness of the resin film 14 obtained by the formation of the first and second vapor-deposited polymer films 18a, 18b cannot be improved. On the contrary, the workability of the formation of the first and second vapor-deposited polymer films 18a, 18b may be deteriorated and the cost thereof may be increased. Further, the thickness of the first and second vapor-deposited polymer films 18a, 18b formed on each surface of the composite dielectric layer 82 with the first vapor-deposited metal film layer 18a therebetween is generally about 0.01 to 30 μm, which is similar to the thickness of the first vapor-deposited polymer film 18a included in the capacitor element 12 of the film capacitor 10 of the above-described first embodiment.

The composite dielectric layer 82 may be constituted by only including the first vapor-deposited polymer film 18a on only one surface of the resin film 14. In such a case, the first vapor-deposited metal film layer 16a is formed on the first vapor-deposited polymer film 18a of the composite dielectric layer 82 and the second vapor-deposited metal film layer 16b is formed on the resin film 14 of the composite dielectric layer 82 at the side where the first vapor-deposited polymer film 18a is not formed.

In the film capacitor 80 including the capacitor element 81 having the above-described structure, the composite dielectric layer 82, in which the first and second vapor-deposited polymer films 18a, 18b are formed on each surface of the resin film 14, is positioned between the first and second vapor-deposited metal film layers 16a, 16b. Thus, the composite dielectric layer 82 including the resin film 14 as a base functions as the dielectric layer. As a result, the capacitance can be advantageously increased. Further, in the film capacitor 80, by the formation of the first and second vapor-deposited polymer films 18a, 18b on each surface of the resin film 14, even if the thickness of the resin film 14 is made smaller, the composite dielectric layer 82 consisting of the resin film 14 and the first and second vapor-deposited polymer films 18a, 18b can advantageously obtain both of the high dielectric and the high withstand voltage. Further, even if the resin film 14 is made of a stretched film, for example, the surface smoothness of the composite dielectric layer 82 can be easily and effectively improved, which also results in the improvement of the withstand voltage of the composite dielectric layer 82.

Thus, the film capacitor 80 can advantageously be made smaller and made to have a higher capacity while securing sufficient withstand voltage, in addition to the above advantages obtained by the formation of the first and second resin protective films (28a, 28b) formed by deposition polymerization on the third and fourth side surfaces (22c, 22d), which are not shown.

Figure 8:
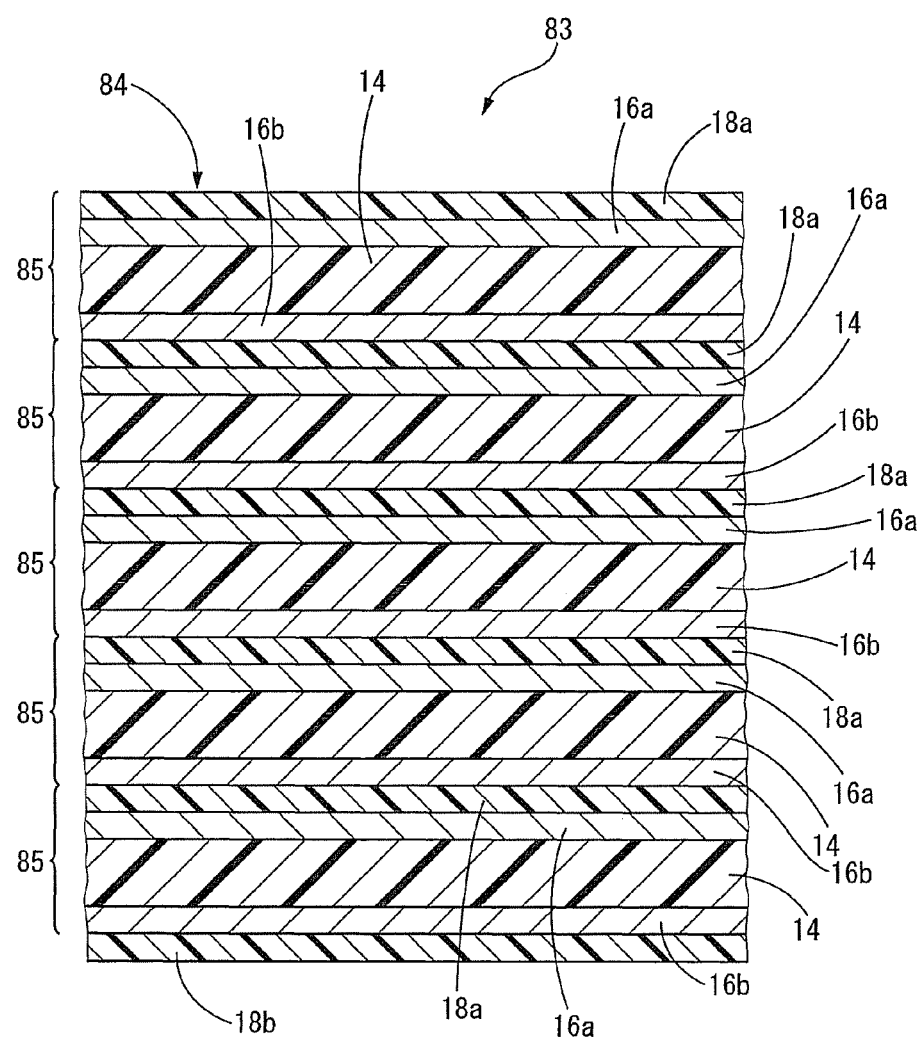
FIG. 8 is a partially enlarged cross sectional view showing a still further embodiment of the film capacitor having a structure of the present invention.

A capacitor element 84 included in the film capacitor 83 shown in FIG. 8 includes a basic element 85 in which each of the first and second vapor-deposited metal film layers 16a, 16b is formed on each surface of the resin film 14 and the first vapor-deposited polymer film 18a is further formed on the surface of the first vapor-deposited metal film layer 16a at the side opposite to the resin film 14 side. Then, a plurality of the basic elements 85 are stacked such that the first vapor-deposited polymer film 18a and the second vapor-deposited metal film layer 16b are stacked, and the second vapor-deposited polymer film 18b is formed on the surface of the second vapor-deposited metal film layer 16b that is positioned at the bottom of the plurality of basic elements 85 at the side opposite to the resin film 14. Thus, a laminated structure body of the plurality of basic elements 85 constitutes the capacitor element 84, and eventually the film capacitor 83.

The film capacitor 83 includes not only a structure A in which only the resin film 14 is positioned between the first vapor-deposited metal film layer 16a and the second vapor-deposited metal film layer 16b, but also a structure B in which only the first vapor-deposited polymer film 18a having an extremely small and uniform thickness and extremely few impurities therein is positioned between the first vapor-deposited metal film layer 16a and the second vapor-deposited metal film layer 16b.

As a result, in addition to the above-described advantages obtained by the formation of the first and second resin protective films (28a, 28b) formed by deposition polymerization on the third and fourth side surfaces (22c, 22d), which are not shown, the film capacitor 83 of the present embodiment can advantageously have a higher-performance by reducing the size thereof and improving the capacity thereof, without improving the functionality of the resin film 14 by reducing the thickness of the resin film 14, without reducing the impurities in the resin film 14, and further without causing the problems which will be caused by reducing the thickness of the resin film 14.

Figure 9:
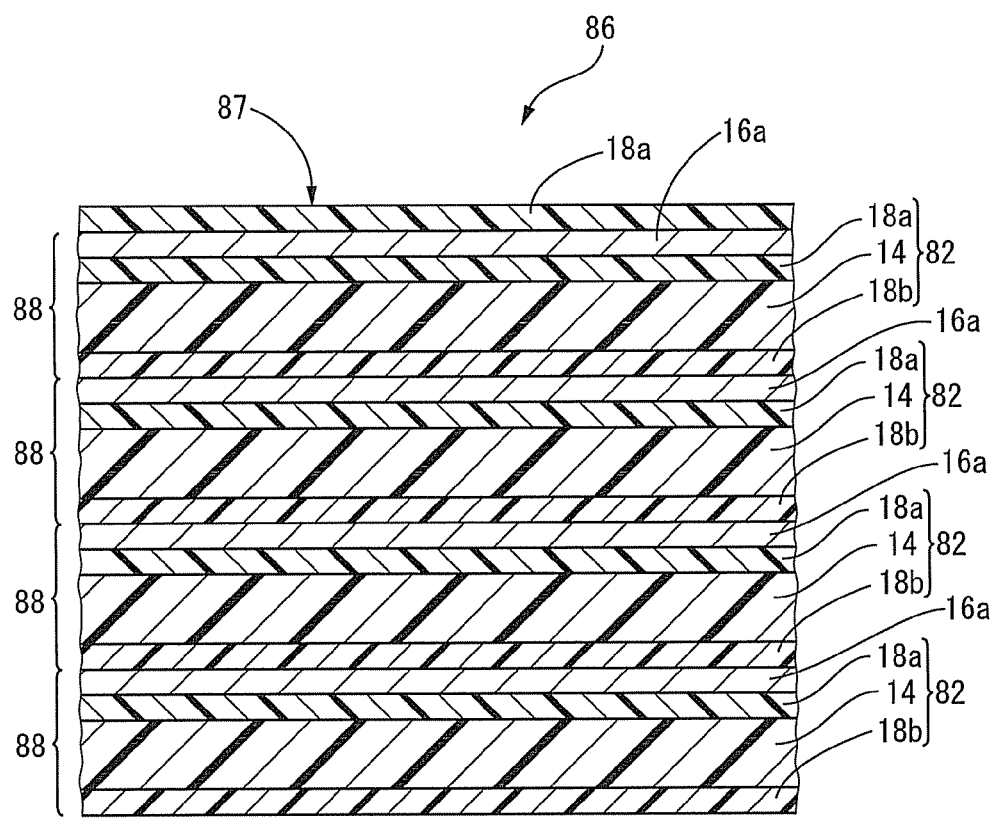
FIG. 9 is a partially enlarged cross sectional view showing another embodiment of the film capacitor having a structure of the present invention.

A capacitor element 87 included in the film capacitor 86 shown in FIG. 9 includes a basic element 88 including the composite dielectric layer 82 in which each of the first vapor-deposited polymer film 18a and the second vapor-deposited polymer film 18b is formed on each surface of the resin film 14, and another first vapor-deposited polymer metal film layer 16a further formed on the surface of the first vapor-deposited polymer film 18a of the composite dielectric layer 82 at the side opposite to the resin film 14. Then, a plurality of the basic elements 88 are stacked such that the first vapor-deposited metal film layer 16a and the second vapor-deposited polymer film 18b are stacked with each other. Further, on the first vapor-deposited metal film layer 16a that is positioned at the top of the plurality of basic elements 88, which are stacked with each other, the first vapor-deposited polymer film 18a is further formed. Thus, the laminated structure body of the basic elements 88 constitutes the capacitor element 87, and eventually the film capacitor 86.

Due to the composite dielectric layer 82, the film capacitor 86 can advantageously be made smaller and made to have a higher capacity while securing a sufficient withstand voltage, in addition to the advantages obtained by the formation of the first and second resin protective films (28a, 28b) formed by deposition polymerization on the third and fourth side surfaces (22c, 22d), which are not shown.

Figure 10:
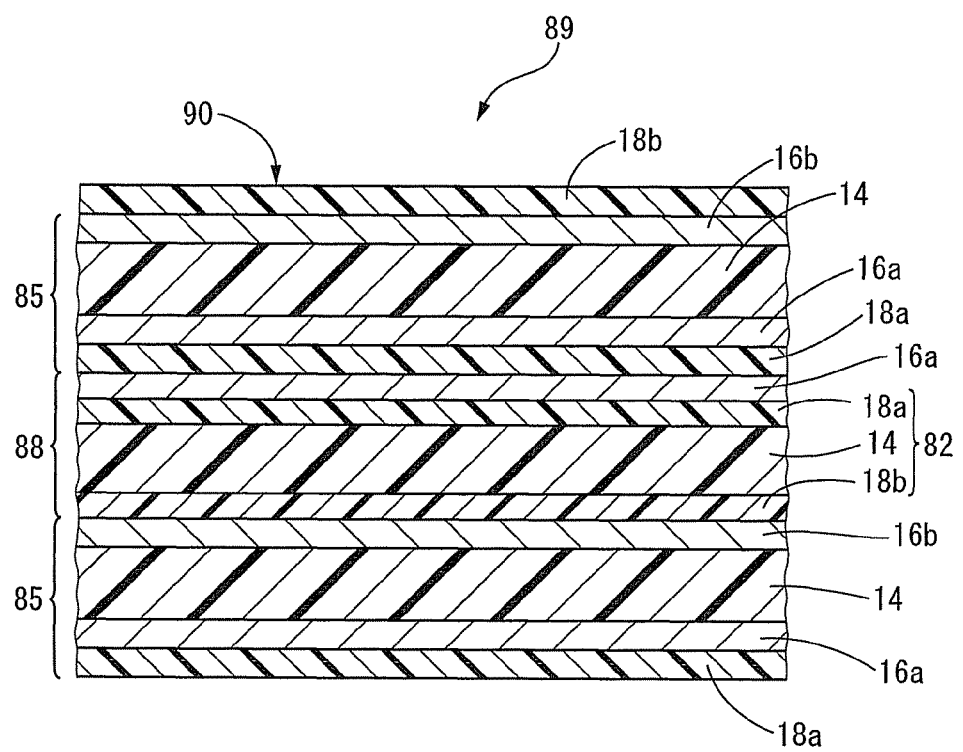
FIG. 10 is a partially enlarged cross sectional view showing a further embodiment of the film capacitor having a structure of the present invention.

A capacitor element 90 included in the film capacitor 89 shown in FIG. 10 includes the basic element 88, which is included in the capacitor element 87 of the film capacitor 86 shown in FIG. 9, and the basic element 85, which is included in the capacitor element 84 of the film capacitor 83 shown in FIG. 8. The basic element 85 is stacked on each surface of the basic element 88 in the thickness direction of the basic element 88 (in the vertical direction). The basic elements 88 and 85 are stacked such that the second vapor-deposited polymer film 18b of the basic element 88 is stacked on the second vapor-deposited metal film layer 16b of the basic element 85 positioned below the basic element 88, and the first vapor-deposited polymer film 18a of the basic element 85 positioned above the basic element 88 is stacked on the first vapor-deposited metal film layer 16a of the basic element 88. Then, another second vapor-deposited polymer film 18b is further stacked on the second vapor-deposited metal film layer 16b of the basic element 85 positioned above the basic element 88. Thus, the laminated structure body of two kinds of the basic elements 85, 88 constitutes the capacitor element 90, and eventually the film capacitor 89.

The film capacitor 89 includes a structure A in which only the resin film 14 is positioned between the first vapor-deposited metal film layer 16a and the second vapor-deposited metal film layer 16b, a structure B in which only the first vapor-deposited polymer film 18a is positioned between two first vapor-deposited metal film layers 16a and 16a, and the composite dielectric layer 82.

Thus, in addition to the above-described excellent advantages obtained by the formation of the first and second resin protective films (28a, 28b), which are formed by deposition polymerization, on the third and fourth side surfaces (22c, 22d) which are not shown, the film capacitor 89 of the present embodiment can advantageously be made smaller and made to have a higher capacity while securing a sufficient withstand voltage without causing the problems which will be caused by reducing the thickness of the resin film 14.

Although not shown in the drawings, the capacitor element included in the film capacitor of the present invention may include a plurality of resin films 14 and a plurality of first vapor-deposited metal film layers 16a that are arranged alternately.

Further, in the production of the film capacitor of the present invention, the above-described deposition system 30 is not necessarily used when the resin protective film is formed on the side surface of the capacitor element. The resin protective film may be formed by various known deposition polymerization.

The numbers of dielectric layers (the resin film 14, the first and second vapor-deposited polymer films 18a, 18b, and the composite dielectric layer 82) and the first and second vapor-deposited metal film layers 16a, 16b are not limited to the above examples.

Although further details will not be described herein, it is to be understood that the present invention may be embodied with various other changes and modifications which may occur to those skilled in the art, without departing from the spirit and scope of the invention.

What is claimed is:

1. A stacked film capacitor comprising:
   a capacitor element including a plurality of dielectric layers and a plurality of vapor-deposited metal film layers, each dielectric layer and each vapor-deposited metal film layer are stacked with each other so as to be arranged alternately,
   a pair of external electrodes provided on opposing side surfaces of the capacitor element, and
   at least one resin protective film provided on at least one side surface other than the side surfaces on which the pair of external electrodes are formed,
   wherein the at least one resin protective film is provided by deposition polymerization.

2. The stacked film capacitor according to claim 1, wherein the plurality of dielectric layers consists of at least one resin film and at least one vapor-deposited polymer film which is made of the same material as the at least one resin protective film.

3. The stacked film capacitor according to claim 2, wherein the at least one vapor-deposited polymer film is positioned on at least one of the at least one resin film and one of the plurality of vapor-deposited metal film layers.

4. The stacked film capacitor according to claim 3, wherein the capacitor element includes a section in which only the at least one vapor-deposited polymer film is positioned between the plurality of vapor-deposited metal film layers.

5. The stacked film capacitor according to claim 4, wherein the at least one vapor-deposited polymer film positioned between the plurality of vapor-deposited metal film layers has a thickness of 0.01 to 30 μm.

6. The stacked film capacitor according to claim 3, wherein at least one of the plurality of dielectric layers consists of a composite dielectric layer including the at least one resin film and the at least one vapor-deposited polymer film positioned on at least one surface of the at least one resin film.

7. The stacked film capacitor according to claim 6, wherein the at least one vapor-deposited polymer film included in the composite dielectric layer has a thickness of 0.001 to 10 μm.

8. The stacked film capacitor according to claim 2, wherein the at least one vapor-deposited polymer film is formed of a resin film selected from the group consisting of a polyurea resin film, polyamide resin film, polyimide resin film, polyamideimide resin film, polyester resin film, polyazomethine resin film, polyurethane resin film and acrylic resin film.

9. The stacked film capacitor according to claim 2, wherein at least one side surface other than the side surfaces on which the pair of external electrodes are formed is plasma treated.

10. The stacked film capacitor according to claim 2, wherein a dielectric constant of the at least one vapor-deposited polymer film included in the plurality of dielectric layers is higher than that of the at least one resin film.

11. The stacked film capacitor according to claim 2, wherein the capacitor element has a structure in which the at least one vapor-deposited polymer film and the plurality of vapor-deposited metal film layers are stacked with each other so as to be arranged alternately on the at least one resin film.

12. The stacked film capacitor according to claim 1, wherein the at least one resin protective film has a three-dimensional cross-linked structure.

13. The stacked film capacitor according to claim 1, wherein the at least one resin protective film is formed of a resin film selected from the group consisting of a polyurea resin film, polyamide resin film, polyimide resin film, polyamideimide resin film, polyester resin film, polyazomethine resin film, polyurethane resin film and acrylic resin film.

14. The stacked film capacitor according to claim 1, wherein the at least one resin protective film is formed by vacuum deposition polymerization on side surfaces of the capacitor element that are opposed to each other in a direction perpendicular to both (i) an opposing direction of the side surfaces on which the pair of external electrodes are formed, and (ii) a stacking direction of the plurality of dielectric layers and the plurality of vapor-deposited metal film layers.

15. A method of producing a stacked film capacitor comprising the steps of:
providing a capacitor element including a plurality of dielectric layers and a plurality of vapor-deposited metal film layers, each dielectric layer and each vapor-deposited metal film layer are stacked with each other so as to be arranged alternately;
forming a pair of external electrodes on opposing side surfaces of the capacitor element, and
forming at least one resin protective film by deposition polymerization on at least one side surface of the capacitor element other than the side surfaces on which the pair of external electrodes are formed.

16. The method of producing a stacked film capacitor according to claim 15, wherein the at least one resin protective film is formed by vacuum deposition polymerization on side surfaces of the capacitor element that are opposed to each other in a direction perpendicular to both (i) an opposing direction of the side surfaces on which the pair of external electrodes are formed, and (ii) a stacking direction of the plurality of dielectric layers and the plurality of vapor-deposited metal film layers.

* * * * *